United States Patent [19]
Ikeda et al.

[11] Patent Number: 5,879,262
[45] Date of Patent: Mar. 9, 1999

[54] POWER TRANSMITTING DEVICE WHEREIN POWER IS DISTRIBUTED TO TWO SIDE GEARS THROUGH PARTITION WALL INTERPOSED BETWEEN THE GEARS AND ROTATED WITH DIFFERENTIAL CASE

[75] Inventors: Akihiko Ikeda, Aichi-ken; Mitsuru Ohba, Anjo; Tomoyuki Kano; Shinji Ogawa, both of Toyota, all of Japan

[73] Assignee: Toyota Jidosha Kabushiki Kaisha, Toyota, Japan

[21] Appl. No.: 921,084

[22] Filed: Aug. 29, 1997

[30] Foreign Application Priority Data

Sep. 3, 1996 [JP] Japan .................................. 8-232907

[51] Int. Cl.⁶ .......................... F16H 48/06; F16H 57/08; F16H 37/08
[52] U.S. Cl. .......................... 475/248; 475/252; 475/338; 475/339; 475/206
[58] Field of Search ..................... 475/248, 252, 475/338, 339, 206; 180/248; 74/665

[56] References Cited

U.S. PATENT DOCUMENTS

| | | | |
|---|---|---|---|
| 5,443,431 | 8/1995 | Cilano | 475/249 |
| 5,472,387 | 12/1995 | Kamlukin | 475/338 |
| 5,692,989 | 12/1997 | Kamlukin | 475/338 X |

FOREIGN PATENT DOCUMENTS

| | | |
|---|---|---|
| 7-156678 | 6/1995 | Japan . |
| 7-506419 | 7/1995 | Japan . |
| 8-145151 | 6/1996 | Japan . |
| 1000539 | 8/1965 | United Kingdom ................... 475/339 |

*Primary Examiner*—Khoi Q. Ta
*Assistant Examiner*—Brandon C. Stallman
*Attorney, Agent, or Firm*—Oblon, Spivak, McClelland, Maier, & Neustadt, P.C.

[57] ABSTRACT

Power transmitting device wherein power received from drive source (22) through an input member (44) is distributed to two side gears (12, 14) engaging respective pinions (16, 18), so as to permit differential rotation of the side gears, through differential case (10) which houses the side gears and rotatably supports the pinions, and through a partition wall (42) which is interposed between the side gears so as to be rotated with the input member and the differential casing.

10 Claims, 7 Drawing Sheets

POWER TRANSMITTING DEVICE WHEREIN POWER IS DISTRIBUTED TO TWO SIDE GEARS THROUGH PARTITION WALL INTERPOSED BETWEEN THE GEARS AND ROTATED WITH DIFFERENTIAL CASE

CROSS REFERENCE TO RELATED APPLICATIONS

Not Applicable

BACKGROUND OF THE INVENTION

1. Field of the Invention

The present invention relates in general to a power transmitting device, and more particularly to improvements of a power transmitting device including a first side gear and a second side gear to which power received from rotary driving means is distributed through a differential case while, so as to permit differential rotation of the first and second side gears.

2. Discussion of the Related Art

There is known a power transmitting device (so-called "parallel axes type differential gear device") comprising: (a) a differential case rotated about a centerline by rotary driving means; (b) a first and a second externally toothed side gear which are disposed within said differential case coaxially with said differential case and rotatably about said centerline; (c) at least one first pinion member disposed rotatably about respective first axes offset from and parallel with said centerline, supported by said differential case so as to be rotated therewith about said centerline, and engaging said first side gears; and (d) at least one second pinion member disposed rotatably about respective second axes offset from and parallel with said centerline, supported by said differential case so as to be rotated therewith about said centerline, and engaging said second side gears and said at least one first pinion member, and wherein power received from the rotary driving means is distributed through the differential case to the first and second side gears, so as to permit differential rotation of the first and second side gears.

An example of the above-indicated type of power transmitting device is disclosed in JP-A-7-506419. During the differential rotation of the first and second side gears, a radial load, or a radial load and a thrust load acts or act on the first and second pinion members due to a load of engagement thereof with the first and second side gears, so that the pinion members are forced against the inner surfaces of the differential case, with a result of generation of a friction force therebetween, which restricts relative rotation of the two side gears, thereby providing a torque sensing type differential limiting effect.

For example, the power transmitting device as described above is constructed as schematically illustrated in FIG. 5. This device includes: a differential case 10 which is rotated about a centerline O by rotary driving means in the form of an engine of an automotive vehicle; a first side gear 12 and a second side gear 14 which are externally toothed gears and which are disposed within the differential case 10 coaxially therewith and rotatably about the centerline O; first pinion members 16 which are disposed rotatably about respective first axes offset from and parallel to the centerline O, supported by the differential case 10 so as to be rotated therewith about the centerline O, and engage the first side gear 12; and second pinion members 18 which are disposed rotatably about respective second axes offset from and parallel with the centerline O, supported by the differential case 10 so as to be rotated therewith about the centerline O, and engage the second side gear 14 and the first pinion members 16. In this power transmitting device, power or torque received by the differential case 10 is distributed to the first and second side gears 12, 14.

The first pinion members 16 are arranged equiangularly in the circumferential direction of the differential case 10 about the centerline O, while the second pinion members 18 are arranged equiangularly in the circumferential direction of the differential case about the centerline O such that each second pinion member 18 is in meshing engagement with the corresponding one of the second pinion members 18. For instance, the first pinion members 16 consist of three first pinions members while the second pinion members 18 consist of three second pinion members meshing with the respective first pinion members 16.

Described in detail, the differential case 10 have pinion holes and support shafts. These pinion holes or pinion support shafts are evenly spaced from each other in the circumferential direction of the differential case 10, so that the first and second pinion members 16, 18 are accommodated in the respective pinion holes and rotatably mounted on the respective pinion support shafts, such that there are left suitable amounts of clearances between the pinion members 16, 18 and the surfaces of the pinion holes and support shafts, so as to give the pinion members 16, 18 some amounts of plays. During differential rotation of the first and second side gears 12, 14, the pinion members 16, 18 are forced against the surfaces of the differential case 10 due to a load of meshing engagement of the pinion members 16, 18 with the side gears 12, 14, and the friction force between the pinion members 16, 18 and the differential case 10 acts to restrict relative rotation of the two side gears. Where the side gears 12, 14 and the pinion members 16, 18 are spur gears, a radial load acts on the pinion members 16, 18, due to the pressure angle, and the top faces or lands of the teeth of the pinion members 16, 18 are forced onto the inner wall surfaces of the pinion holes, etc. Where the side gears 12, 14 and the pinion members 16, 18 are helical gears having twisted tooth traces, a thrust load acts on the pinion members 16, 18, due to the helix angle, and the axial end faces of the pinion members 16, 18 are also forced onto the inner side walls of the differential case 10.

In the example of FIG. 5, the first and second side gears 12, 14 have the same outside diameter, so that the torque is equally distributed to these two side gears 12, 14. However, the two side gears 12, 14 may have different outside diameters to achieve uneven torque distribution.

However, the power transmitting device as shown in FIG. 5 is limited in the positions at which the power is received and transmitted to external members such as drive wheels of a motor vehicle. In a center differential device 20 of a motor vehicle illustrated in FIG. 6, for instance, power generated by an engine 22 as the rotary driving means is received by the center differential device 20 through a transmission 24, and is distributed by the device 20 to front and rear drive wheels of the motor vehicle. To transmit the power from the center differential device 20 to the front drive wheels, a sprocket is disposed between the transmission 24 and the center differential device 20, so that the power is transmitted to the front drive wheels through a chain 26 engaging the sprocket. This type of power transmitting system suffers from a relatively low degree of flexibility in the positions of the power input and outputs. Described more specifically referring back to FIG. 5, the power is received at a radially outer portion of the device, and first and second outputs are provided at the centerline O of the device. In this case, the second output to the front drive wheels cannot be transferred to the chain 26.

On the other hand, the power transmitting device may be adapted to receive the input power at the centerline O, as indicated in FIGS. 7 and 8. In these cases, however, the first output from the first side gear 12 and the second output from the second side gear 14 are both provided on the same axial side (rear or front) of the power transmitting device.

The power transmitting device of FIG. 7 may be modified as shown in FIG. 9. In this modified arrangement, an outer shell 28 is disposed outwardly of the differential case 10, so that the first output to the front drive wheels can be obtained at the front side of the device, through the outer shell 28 via a member splined to the outer shell 28. Similarly, the power transmitting device of FIG. 8 may be modified as shown in FIG. 10. In this modified arrangement, too, an outer shell 30 is disposed outwardly of the differential case 10, so that the second output to the rear drive wheels can be obtained at the rear side of the device, through the outer shell 30 via a member splined to the outer shell 30. However, these modified power transmitting devices suffer from an increased radial dimension and an increased number of components, and are not necessarily satisfactory in the overall evaluation.

SUMMARY OF THE INVENTION

It is therefore an object of the present invention to provide a power transmitting device (parallel axes type differential gear device) which is simple and compact in construction with a reduced weight and which is adapted to receive power at its centerline and capable of providing power outputs on the axially opposite sides thereof.

The above object may be achieved according to the principle of this invention, which provides a power transmitting device comprising: (a) a differential case rotated about a centerline by rotary driving means; (b) a first and a second externally toothed side gear which are disposed within the differential case coaxially with the differential case and rotatably about the centerline; (c) at least one first pinion member disposed rotatably about respective first axes offset from and parallel with the centerline, supported by the differential case so as to be rotated therewith about the centerline, and engaging the first side gears; (d) at least one second pinion member disposed rotatably about respective second axes offset from and parallel with the centerline, supported by the differential case so as to be rotated therewith about the centerline, and engaging the second side gears and the at least one first pinion member; (e) a partition member provided in the differential case, so as to be rotated therewith, and interposed between the first and second side gears in a direction parallel to the centerline; and (g) an input member extending through at least one of the first and second side gears coaxially therewith, for transmitting power received from the rotary driving means to the differential case through the partition wall, whereby the power is distributed through the differential case to the first and second side gears, so as to permit differential rotation of the first and second side gears.

In the power transmitting device of the present invention constructed as described above, the power is received by the differential case through the input member, and the partition wall interposed between the first and second side gears. Thus, the power is received at the centerline of the device, and the power outputs can be provided on the axially opposite sides of the device. Further, the power outputs can be provided directly from the first and second side gears, on the axially opposite sides of the device, without using an outer shell as shown in FIGS. 9 and 10. Accordingly, the device can be made compact and simplified in construction with a reduced weight, as compared with the devices shown in FIGS. 9 and 10.

The present power transmitting device may be suitably used as a center differential device for distributing power to front and rear drive wheels of a four-wheel drive motor vehicle, and as a differential gear device for distributing power to right and left drive wheels of the vehicle. However, the present power transmitting device may have other applications. In particular, the present power transmitting device can be suitably used as a center differential device which is adapted to provide the power output to the front drive wheels through a sprocket and a chain, as indicated in FIG. 6. However, the power transmitting device of the invention can be used as various other types of center differential device, such as the one disposed in a transfer of a transversal transaxle.

While the power transmitting device is adapted to distribute the received power to the first and second side gears so as to permit differential rotation of these side gears, the device may be further adapted so that during the differential rotation of the first and second side gears, a radial load, or a radial load and a thrust load acts or act on the first and second pinion members due to a load of meshing engagement thereof with the first and second side gears, so that the pinion members are forced against the inner surfaces of the differential case, with a result of generation of a friction force therebetween, which restricts relative rotation of the two side gears, thereby providing a torque sensing type differential limiting effect.

Each of the pinion members and the side gears may be a spur gear, but is preferably a helical gear having a suitable helix angle. Where the helical gears are used as the pinion members and side gears, the above-indicated thrust load acts on the pinion members.

While the partition wall may be formed as an integral part of the differential case, it may be formed independently of the differential case and fixed or connected to the differential case. In the latter case, the partition wall may be splined to the differential case for rotation therewith. In any case, the partition wall is provided in the differential case so as to be rotated therewith. The input member may be formed integrally with the partition member, or may be a member which is formed independently of the partition wall and fixed or connected to the partition wall so that the partition member is rotated with the input member.

The differential case may include a cylindrical member, and a pair of side wall members which are respectively fixed to axially opposite ends of the cylindrical member. In this case, the partition wall may be formed as an integral part of the axially intermediate member.

The input member may extend through one or both of the first and second side gears, and may be splined to the partition wall for rotation therewith.

For permitting reversal of an assembly of the differential case, first and second side gears and the first and second pinion members with respect to the direction in which the power is transmitted from the rotary driving means to the assembly, it is desirable that the first and second side gears have a same inside diameter and a same axial length. This arrangement is desirable particularly where the power transmitting device comprises an output shaft having a cylindrical portion to which one of the first and second side gears is splined, and a sprocket through which the input member extends and which has a cylindrical portion to which the other of the first and second side gears is splined. In this case, it is desired that the cylindrical portions of the output shaft and the sprocket have a same outside diameter as the inside diameter of the first and second side gears, so that the above-indicated assembly can be reversed to reverse the positions of the two side gears. If the first and second side gears are located on the upstream and downstream sides, respectively, in the power input direction, the positions of the first and second side gears can be changed such that the first and second side gears are located on the downstream and upstream sides, respectively. In this respect, it is noted that where the two side gears have different outside diameters, different torques are distributed from the first and second side gears to one and the other of the front and rear drive wheels. In this case, the reversal of the positions of the two side gears results in a change in the torque distribution to the front and rear drive wheels.

BRIEF DESCRIPTION OF THE DRAWINGS

The above and optional objects, features, advantages and technical and industrial significance of the invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
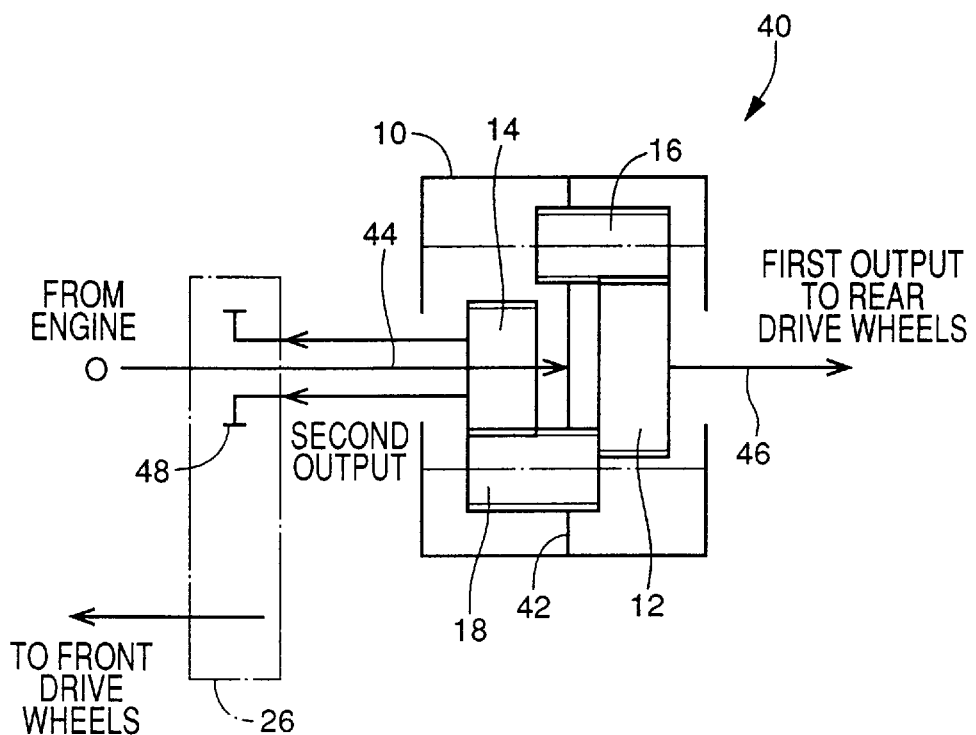
FIG. 1 is a schematic view illustrating one embodiment of a power transmitting device of this invention.
Figure 2:
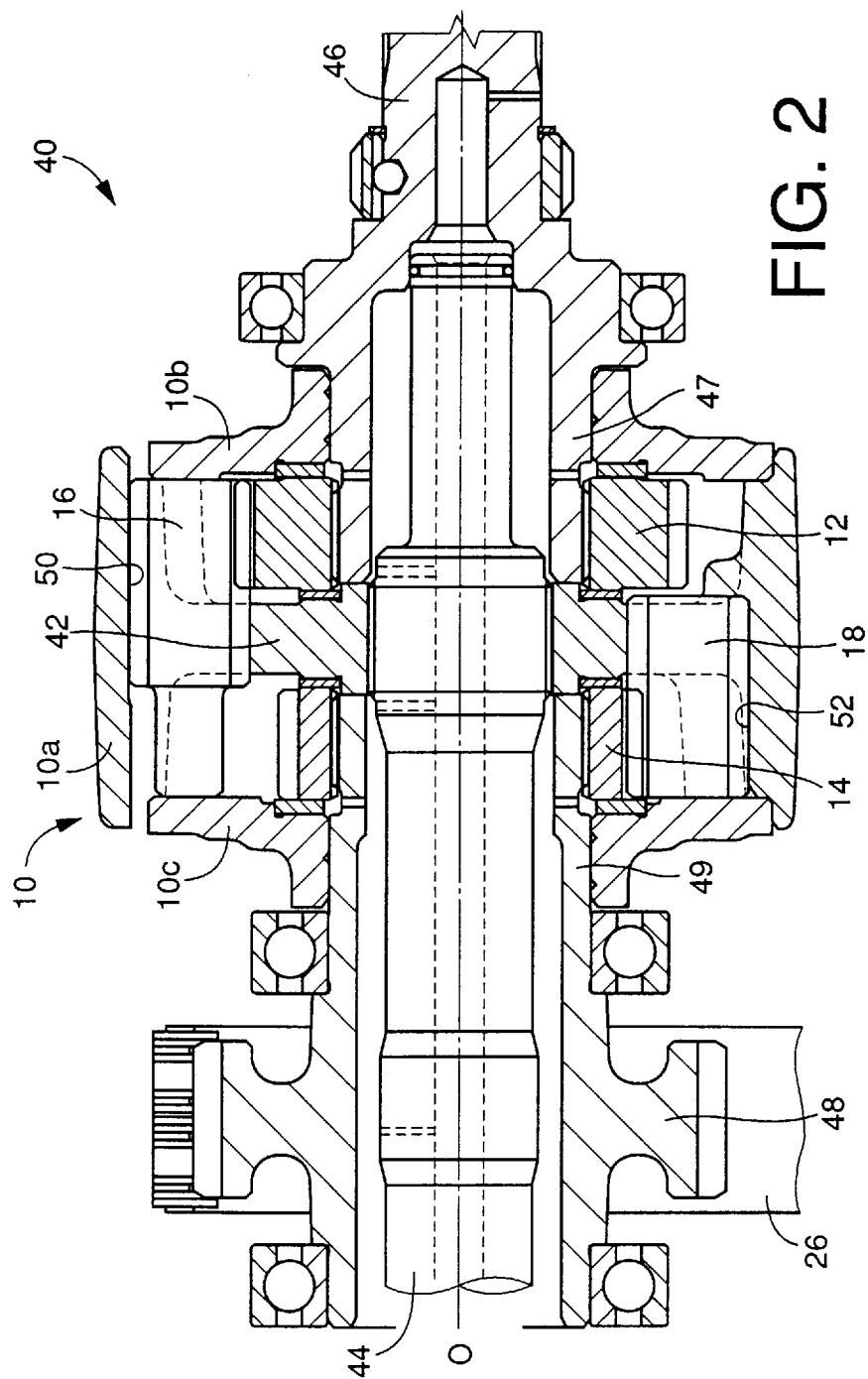
FIG. 2 is a cross sectional view showing in detail the power transmitting device of FIG. 1.

Referring first to FIGS. 1 and 2, there is shown a power transmitting system 40 constructed according to one embodiment of this invention. In these figures, the same reference numerals as used in FIGS. 5–10 are used to identify the functionally corresponding components, detailed description of which will not be provided to avoid redundancy of description.

Figure 6:
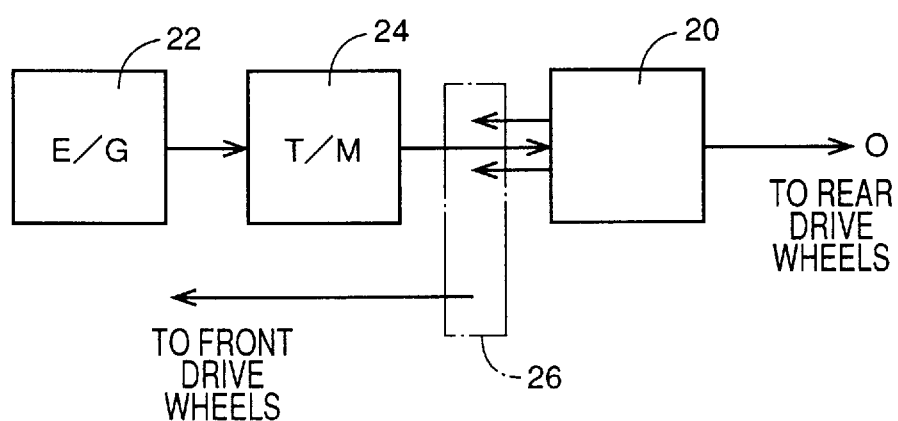
FIG. 6 is a view illustrating a center differential device to which the principle of the present invention is suitably applicable.
Figure 7:
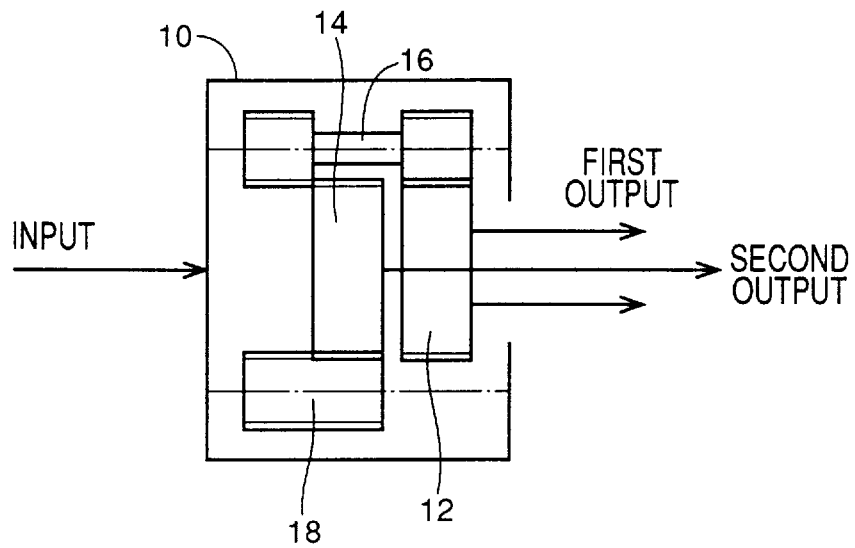
FIG. 7 is a schematic view of a known power transmitting device, showing one form of power outputs where the power is received at the centerline of the device.
Figure 8:
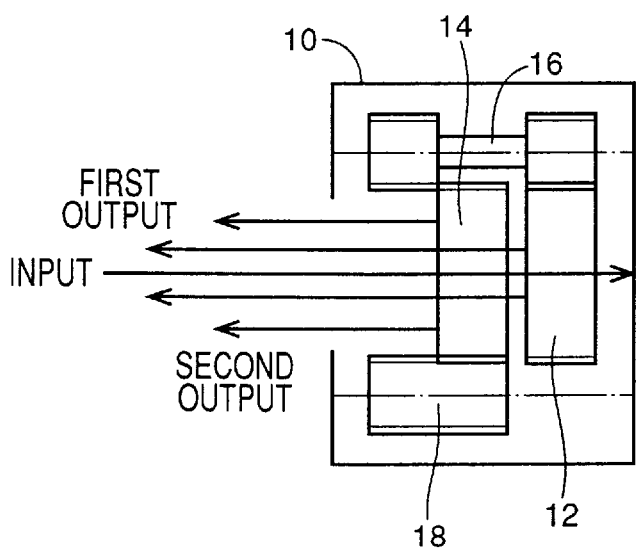
FIG. 8 is a schematic view of a known power transmitting device, showing another form of power outputs where the power is received at the centerline of the device.

The power transmitting device 40 can be suitably used as the center differential device 20 of FIG. 6 of a motor vehicle, which has been described. In the present power transmitting device 40, the differential case 10 consists of a cylindrical member 10a, and a pair of side wall members 10b, 10c respectively disposed at the axially opposite ends of the cylindrical member 10a. These three members 10a, 10b, 10c are connected together by suitable fastening means such as bolts. A partition member in the form of a partition wall 42 is disposed within the differential case 10 such that the partition wall 42 is interposed between the first and second side gears 12, 14 in the axial direction, that is, in the direction parallel to the centerline O. This partition wall 42 is formed as an integral part of the cylindrical member 10a of the differential case 10.

The power transmitting device 40 further includes a front output member in the form of a sprocket 48 operatively connected to front drive wheels of the vehicle through the sprocket 26, and a rear output member in the form of an output shaft 46 operatively connected to rear drive wheels of the vehicle. The sprocket 48 has a cylindrical portion 49 whose end section extends into the differential case 10 through the side wall member 10c, in a coaxial relationship with the differential case 10. The second side gear 14 is splined to the outer circumferential surface of the end section of the cylindrical portion 49. Similarly, the output shaft 46 has a cylindrical portion 47 whose end portion extends into the differential case 10 through the side wall member 10b, in a coaxial relationship with the differential case 10. The first side gear 12 is splined to the outer circumferential surface of the end section of the cylindrical portion 47. The axial position of the partition wall 42 in the differential case 10 is determined by abutting contact with the end faces of the cylindrical portions 49, 47 of the sprocket 48 and the output shaft 46, whereby the differential case 10 as a whole is positioned relative to the sprocket 48 and output shaft 46. The side wall members 10b, 10c rotatably engage the outer circumferential surfaces of the cylindrical portions 49, 47.

An input member in the form of an input shaft 44 extends through the bore of the sprocket 48 and the bore of the cylindrical portion 47 of the output shaft 46, in coaxial relationship with the first and second side gears 12, 14. The input shaft 44 is splined to the partition wall 42 so that the partition wall 42 is rotated with the input shaft 44. In this arrangement, power received from the engine 22 (FIG. 6) is transmitted to the differential case 10 through the input shaft 44 and the partition wall 42. The power is distributed to the first and second side gears 12, 14 through the first and second pinion members 16, 18. Namely, the power transmitted from the first pinion members 16 to the first side gear 12 is transferred as a first output to the rear drive wheels through the output shaft 46, while the power transmitted from the second pinion members 18 to the second side gear 14 is transferred as a second output to the front drive wheels through the sprocket 48 and the chain 26. In the present embodiment, the outside diameter of the second side gear 14 is smaller than that of the first side gear 12, so that the torque distributed to the rear drive wheels is larger than that distributed to the front drive wheels.

The output shaft 46 and the sprocket 48 are supported by suitable members, through bearings, such that the output shaft 46 and the sprocket 48 are rotatable about the centerline O and are not movable in the axial direction. As described above, the first and second side gears 12, 14 are splined to the cylindrical portions 47, 49 of the output shaft 46 and sprocket 48, respectively, so that the side gears 12, 14 are rotated with the output shaft 46 and the sprocket 48, respectively.

In the present embodiment, three first pinion members 16 are arranged in the circumferential direction of the differential case 10 about the centerline O, while three second pinion members 18 are arranged in the circumferential direction of the differential case 10 about the centerline O, such that the second pinion members 18 mesh with the respective three first pinion members 16. Described more specifically, the differential case 10 has three first pinion holes 50 and three second pinion holes 52. The three first pinion members 16 are accommodated in the respective three first pinion holes 50 rotatably about their axes, while the three second pinion members 18 are accommodated in the respective three second pinion holes 52 rotatably about their axes, such that there exist suitable amounts of clearances between the pinion members 16, 18 and the inner surfaces of the pinion holes 50, 52. During differential rotation of the side gears 12, 14, the pinion gears 16, 18 are forced against the surfaces of the pinion holes 50, 52 due to a load of meshing engagement of the pinion members 16, 18 with the side gears 12, 14, so that a force of friction is generated between the pinion gears 16, 18 and the surfaces of the pinion holes 50, 52. The friction force acts to restrict the relative rotation of the two side gears 12, 14, providing a torque sensing type differential limiting effect. The side gears 12, 14 and the pinion members 16, 18 are helical gears, and the load of engagement of the pinion members 16, 18 causes a radial load depending upon the pressure angle, and a thrust load depending upon the helix angle, whereby the top lands or faces of the teeth of the pinion members 16, 18 are forced onto the inner surfaces of the pinion holes 50, 52, while the axial end faces of the pinion gears 16, 18 are forced onto the surfaces of the side wall members 10b, 10c of the differential case 10. The first and second pinion members 16, 18 mesh with each other at their axial portions corresponding to an axially middle portion of the differential case 10, that is, corresponding to the axial dimension of the partition wall 42.

Figure 9:
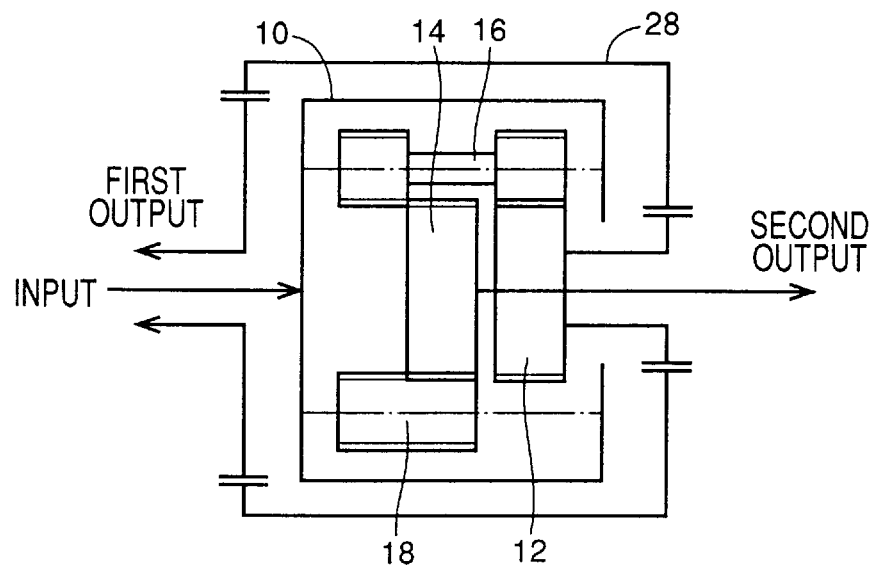
FIG. 9 is a schematic view showing a modification of the power transmitting device of FIG. 7, so that the two power outputs are obtained on the axially opposite sides of the device.
Figure 10:
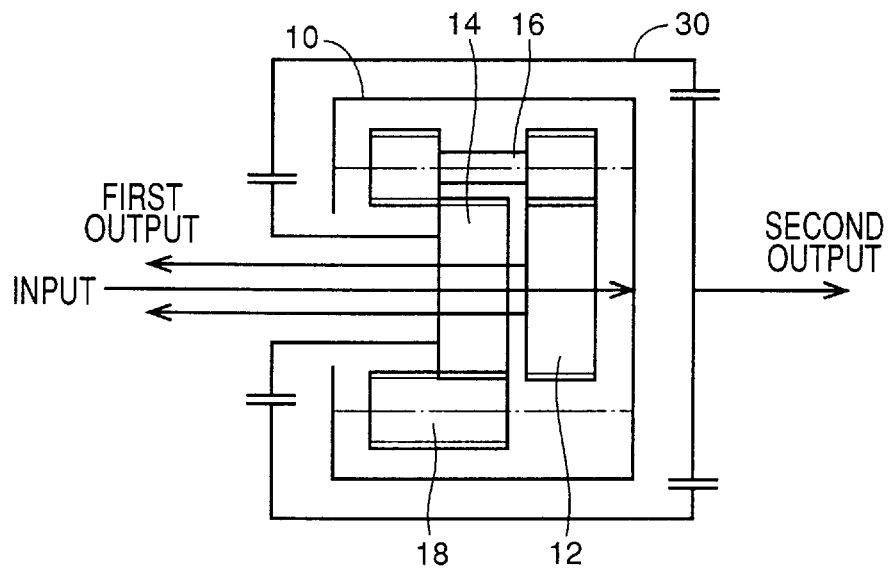
FIG. 10 is a schematic view showing a modification of the power transmitting device of FIG. 8, so that the two power outputs are obtained on the axially opposite sides of the device.

In the power transmitting device 40 constructed as described above, the power is received by the differential case 10 through the input member 44, and the partition wall 42 interposed between the first and second side gears 12, 14. Thus, the power is received at the centerline of the device 40, and the first and second power outputs can be provided on the axially opposite sides of the device 40. Further, the power outputs can be provided directly from the first and second side gears 12, 14, on the axially opposite sides of the device 40, without using an outer shell as shown in FIGS. 9 and 10. Accordingly, the device 40 can be made compact and simplified in construction with a reduced weight, as compared with the devices shown in FIGS. 9 and 10.

Figure 3:
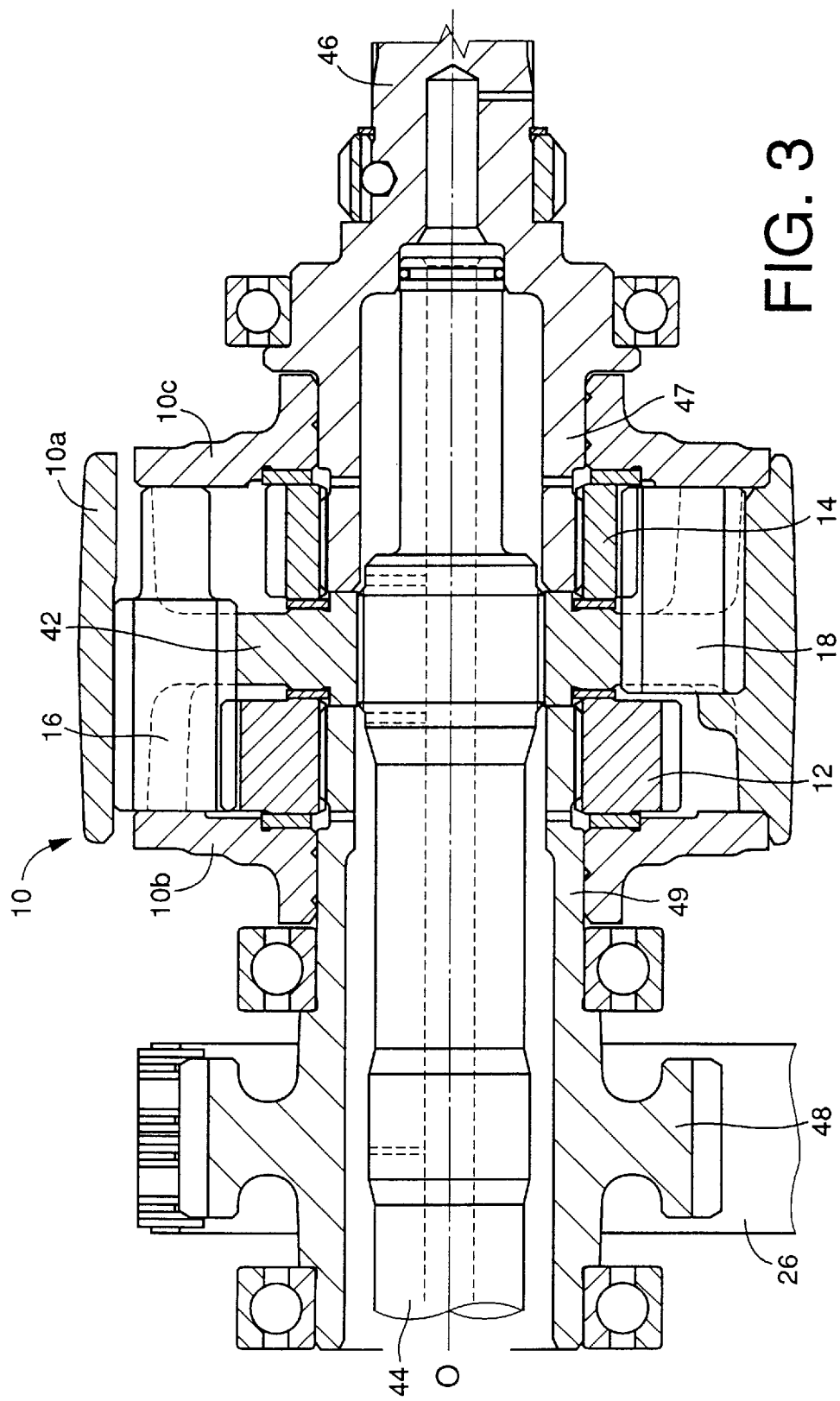
FIG. 3 is a cross sectional view showing a second embodiment of the invention wherein a differential case and the positions of two side gears are laterally reversed with respect to those in the first embodiment of FIG. 2.

As shown in FIG. 2, the side wall members 10b, 10c of the differential casing 10 have the same inside diameter. In other words, the cylindrical portion 47 of the output shaft 46 and the cylindrical portion 49 of the sprocket 48 have the same outside diameter. Further, the first and second side gears 12, 14 have the same inside diameter and the same axial length, and are splined to the cylindrical portions 49, 47 through the respective spline mechanisms which have the same specifications. In the present power transmitting device 40, the differential case 10 and the radially inner portion of a mechanism within the differential case have a symmetrical arrangement with respect to the partition wall 42. In this arrangement, an assembly including the differential case 10, first and second side gears 12, 14 and first and second pinion members 16, 18 can be reversed with respect to the power input direction, as shown in FIG. 3. That is, provided that different motor vehicles use the same output shaft 46 and the same sprocket 48, the above-indicated assembly can be positioned relative to the output shaft 46 and sprocket 48 in a selected one of two positions shown in FIGS. 2 and 3, depending upon the desired torque distribution to the front and rear drive wheels of the vehicle. In the positioning of FIG. 2, the torque distributed to the rear drive wheels from first side gear 12 through the output shaft 46 is larger than the torque distributed to the front drive wheels from the second side gear 14 through the sprocket 48. In the positioning of FIG. 3, the torque distributed to the rear drive wheels from the second side gear 14 through the output shaft 46 is smaller than the torque distributed to the front drive wheels from the first side gear 12 through the sprocket 48.

However, the symmetrical arrangement of the radially inner portion of the mechanism within the differential case 10 is not necessary where the reversal of the above-indicated assembly is not desired. The power transmitting devices of FIGS. 2 and 3 may be considered two different embodiments of the invention. Alternatively, the arrangements of FIGS. 2 and 3 may be considered as two different positioning arrangements of the power transmitting device 40 constructed according to one embodiment of this invention.

Figure 4:
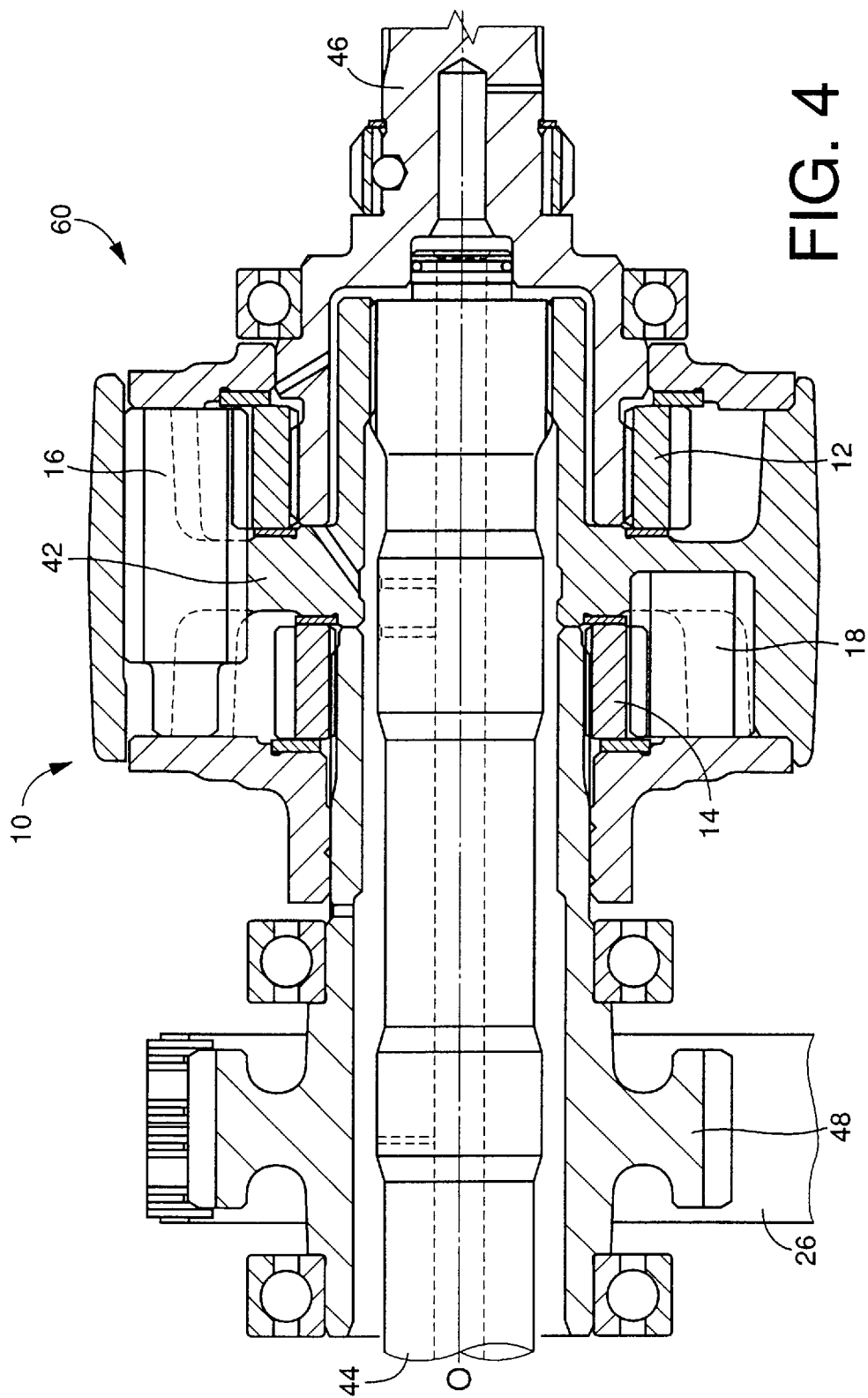
FIG. 4 is a cross sectional view showing a third embodiment of the invention.
Figure 5:
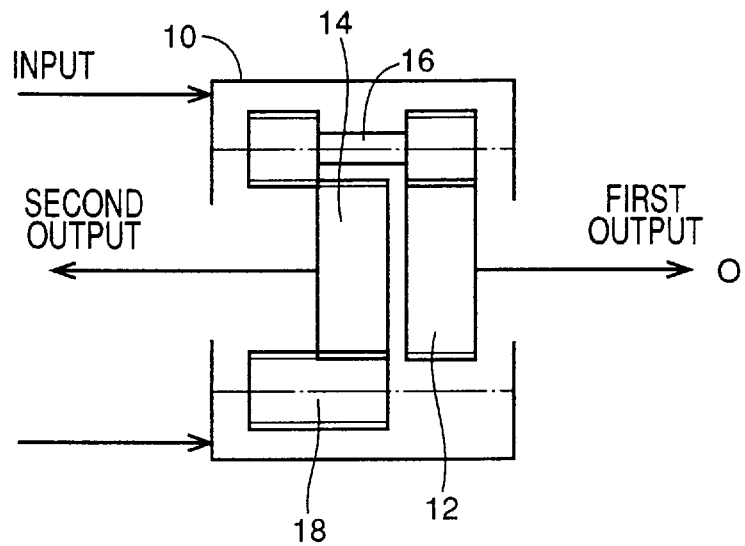
FIG. 5 is a schematic view illustrating a known power transmitting device in the form of a parallel axes type differential gear device, which is similar in basic arrangement to the power transmitting device of the invention.

Referring next to FIG. 4, there is shown a power transmitting device 60 constructed according to another embodiment of the present invention, wherein the input shaft 44 is splined at an axially end portion to an extension of the partition wall 42, and the cylindrical portions of the sprocket 48 and output shaft 46 do not have the same outside diameter at their axial portions to which the first and second side gears 12, 14 are splined. Namely, the two side gears 12, 14 do not have the same inside diameter, but have respective different inside diameters. Therefore, the assembly including the differential case 10, side gears 12, 14 and pinion members 16, 18 cannot be reversed with respect to the power input direction.

While the present invention has been described above in its presently preferred embodiments by reference to the accompanying drawings, it is to be understood that the invention is not limited to the details of the illustrated embodiments, but may be embodied with various changes, modifications and improvements, which may occur to those skilled in the art, without departing from the spirit and scope of the invention defined in the following claims:

What is claimed is:

1. A power transmitting device comprising:
    a differential case rotated about a centerline by rotary driving means;
    a first and a second externally toothed side gear which are disposed within said differential case coaxially with said differential case and rotatably about said centerline;
    at least one first pinion member disposed rotatably about respective first axes offset from and parallel with said centerline, supported by said differential case so as to be rotated therewith about said centerline, and engaging said first side gears;
    at least one second pinion member disposed rotatably about respective second axes offset from and parallel with said centerline, supported by said differential case so as to be rotated therewith about said centerline, and engaging said second side gears and said at least one first pinion member;

a partition member provided in said differential case, so as to be rotated therewith, and interposed between said first and second side gears in a direction parallel to said centerline; and an input member extending through at least one of said first and second side gears coaxially therewith, for transmitting power received from said rotary driving means to said differential case through said partition member, whereby said power is distributed through said differential case to said first and second side gears, so as to permit differential rotation of said first and second side gears.

2. A power transmitting device according to claim 1, wherein said partition member is formed integrally with said differential case.

3. A power transmitting device according to claim 2, wherein said differential case includes a cylindrical member, and a pair of side wall members which are respectively fixed to axially opposite ends of said cylindrical member, said partition wall being formed as an integral part of an axially intermediate member.

4. A power transmitting device according to claim 1, wherein said input member extends through one of said first and second side gears.

5. A power transmitting device according to claim 1, wherein said input member extends through both of said first and second side gears.

6. A power transmitting device according to claim 1, wherein said input member is splined to said partition wall for rotation therewith.

7. A power transmitting device according to claim 1, wherein said first and second side gears have a same inside diameter and a same axial length.

8. A power transmitting device according to claim 7, further comprising:

an output shaft having a cylindrical portion to which one of said first and second side gears is splined;

a sprocket through which said input member extends, said sprocket having a cylindrical portion to which the other of said first and second side gears is splined, and wherein said cylindrical portions of said output shaft and said sprocket have a same outside diameter as said inside diameter of said first and second side gears.

9. A power transmitting device according to claim 1, further comprising a rear output member connected to one of said first and second side gears for transmitting the power to a rear drive wheel of an automotive vehicle having said rotary driving means, and a front output member connected to the other of said first and second side gears for transmitting the power to a front drive wheel of said automotive vehicle.

10. A power transmitting device according to claim 1, wherein said at least one first pinion members consists of three first pinion members arranged in a circumferential direction of said differential case, and said at least one second pinion member consists of three second pinion members which are arranged in said circumferential direction and which engage said three first pinion members.

* * * * *